Nov. 24, 1953    G. W. MORK ET AL    2,660,317
FLUID FILTER
Filed Aug. 2, 1948

GEORGE W. MORK,
JOHN E. MARSON,
THOMAS G. PAULSEN,
INVENTORS,

BY Roger Sherman Hoar

ATTORNEY.

Patented Nov. 24, 1953

2,660,317

UNITED STATES PATENT OFFICE 2,660,317

FLUID FILTER

George W. Mork, South Milwaukee, and John E. Marson and Thomas G. Paulsen, Milwaukee, Wis., assignors to Bucyrus-Erie Company, South Milwaukee, Wis., a corporation of Delaware Application August 2, 1948, Serial No. 42,114

3 Claims. (Cl. 210—165)

Our invention relates to new and useful improvements in filters for fluid circulating systems, more particularly to filters used to purify oil in hydraulic systems for the control of tractor equipment.

In such systems the presence of even a very small amount of dirt or abrasive foreign matter can cause damage to and adversely affect the operation of the hydraulic controls. Hence rapid and efficient filtering of foreign solids from the circulating system is imperative. Furthermore this filtering must be accomplished without appreciably retarding flow upon which operation of the equipment depends, and it must be possible to remove the solids from the filter and/or replace the filter quickly and conveniently in the field without disassembling the main hydraulic circuit.

Accordingly the principal object of our invention is to provide a highly-efficient quick-acting filter for a fluid circulating system.

A further object of our invention is to provide a filter that does not appreciably impede normal flow of fluid in the circulating system in which it is placed.

A further object of our invention is to provide a filter that is simple, inexpensive, compact and easily removable from the circulating system in which it is placed.

In addition to the objects above stated, we have worked out a number of novel and useful details, which will be readily evident as the description progresses.

Our invention consists in the novel parts, and in the combination and arrangement thereof, which are defined in the appended claims, and of which two embodiments are exemplified in the accompanying drawings, which are hereinafter particularly described and explained.

Throughout the description, the same reference number is applied to the same member or to similar members.

Referring now to the accompanying drawings, it will be seen that:

Figure 1:
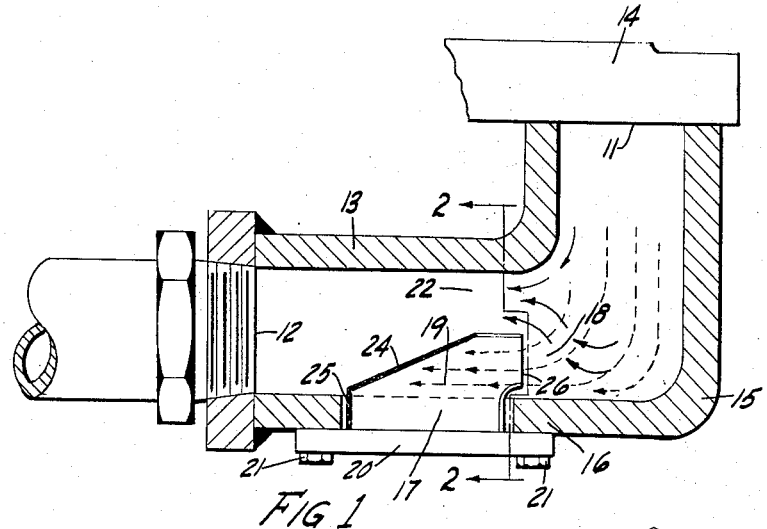
Figure 1 is a view, partly in section, of the first embodiment of our invention, showing our filter element inserted in the elbow of an hydraulic circulating system.
Figure 2:
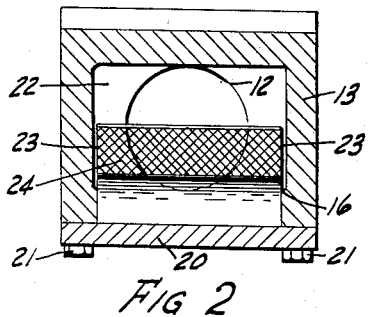
Figure 2 is a sectional view taken along the line 2—2 of Figures 1 and 4.
Figure 3:
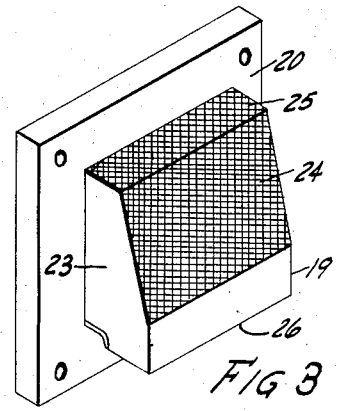
Figure 3 is a view in parallel perspective of the filter element shown removed from the fluid conduit.

Referring now to Figures 1 to 3, we see that 11 and 12 represent the inlet and outlet respectively of a fluid conduit 13 in an hydraulic circulating system. This conduit may be located at the exit port of a pump 14 (fragment only shown in the drawing), although this is not essential. Conduit 13 includes, adjacent its entrance 11, an elbow 15 which is shown as a 90-degree elbow, although this particular angle is not critical for our purpose. The outer wall 16 of conduit 13 is provided with an opening 17 adjacent the exit 18 of elbow 15. Filter element 19 is mounted on base plate 20 which is adapted to be bolted to the outer wall 16 by bolts 21. The filter element is inserted through opening 17 and extends across the outer half of the conduit at the exit 18 of the elbow 15. The other half of the conduit constitutes an unobstructed passage 22 for the fluid. Filter element 19 is in the form of a pocket which comprises longitudinal walls 23, transverse walls 24 and 25. Transverse wall 24 is inclined, in the direction of flow, toward the outer wall 16 of the conduit, and is, with transverse wall 25, perforated in the form of a filter screen.

By placing filter element 19 across only part of the conduit, leaving passage 22 unobstructed, it is possible to avoid impeding the flow of fluid when the filter screen becomes clogged with foreign particles. By placing the filter just at the elbow exit and adjacent the outer wall of the conduit, it is possible to collect in the filter practically all foreign particles in the fluid, such as fine pieces of metal, since these particles are thrown outwardly by centrifugal force as they pass through the elbow and enter the mouth 26 of the filter, leaving relatively pure the fluid that passes through passage 22.

Figure 4:
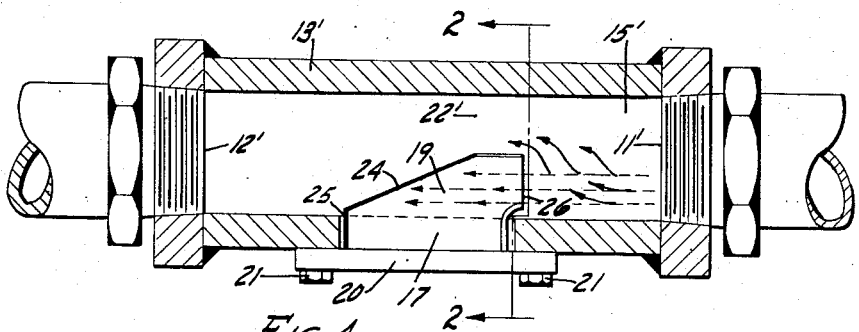
Figure 4 is a view, partly in section, of a second embodiment of our invention, showing the filter element inserted in a straight section of pipe of an hydraulic circulating system.

Turning now, to Figure 4, it is seen that, in the second embodiment of our invention, the elbow used in our first embodiment is not employed, and the filter element 19 is inserted in a straight section of fluid conduit or pipe 13' having inlet 11' and outlet 12'. In this embodiment, normal flow of the fluid through the conduit is not impeded appreciably by the filter element since such flow is well within the capacity of unobstructed passage 22'. That portion of the flow in the lower portion of the conduit inlet that is beyond the capacity of the filter to transmit, is deviated around the filter element, and thence through the passage 22'. The velocity of flow through passage 22' is accordingly considerably greater than the velocity of flow through the main portion 15' of the conduit. Foreign particles (indicated by broken arrows in Figure 4), being heavier than the fluid, does not, however, follow the stream lines (indicated by full arrows in Figure 4) through passage 22', but tend to pass straight on into the filter and are trapped on the inside of the screened walls 24 and 25 of the filter element.

A similar action occurs in our first embodiment, as shown by the full and broken arrows in Figure 1.

Thus it is seen that in the first embodiment (Figure 1) filtering efficiency is achieved, without impeding normal flow, by a centrifugal effect that is due to deviation of flow in the elbow 15 as well as deviation around filter 19 into passage 22; whereas in the second embodiment (Figure 2) the same result is achieved with somewhat less filtering efficiency by using the centrifugal effect due only to deviation of flow around the filter 19 into passage 22'.

Having now described two embodiments of our invention, we wish it to be understood that our invention is not to be limited to the specific form or arrangement of parts herein described and shown.

Thus, it is evident that the particular form of the filter element shown in the drawings is merely illustrative of one possible embodiment, many suitable variations being feasible, for example, in number, location, extent, shape, and type of screening and trapping elements in the filter.

Furthermore, although the invention has been described in its application to a high-velocity oil circulating system commonly used to actuate tractor equipment, it is to be understood that the same is equally applicable to other liquid and fluid circulating systems.

In the claims, by "inner wall of the conduit," we mean the side of the conduit that is adjacent the point about which the conduit is bent at the elbow, and by "outer wall of the conduit" we intend to refer to the side furthest from that point.

We claim:

1. In a filter assembly for a fluid circulating system, the combination of: a fluid conduit angled to form an elbow; an unobstructed main passageway within said conduit adjacent the inner wall of the conduit at the exit of the elbow; and a filter located wholly within the conduit and extending inwardly from said outer wall of the conduit across only the part of the conduit that is adjacent the outer wall of the conduit adjacent the exit of the elbow; whereby foreign particles centrifuged in passing through said elbow will pass into and be retained by said filter without appreciably impeding normal flow of fluid through said main passageway.

2. A filter assembly according to claim 1, further characterized by the fact that the filter is adapted to be inserted into and removed from the conduit through a hole in the wall of the conduit, and has attached thereto a base plate for sealing the hole in the conduit when the filter has been inserted therethrough into the conduit, and that said filter comprises a pocket element attached to the inner face of the base plate, the inner face of the base plate forming the outer side of the pocket, and said pocket element including a screen element extending from one end of the pocket adjacent one end of the inner face of the base plate inwardly at an oblique angle to the base plate to form the inner side of the pocket, an inner lip at the other end of the pocket, and an outer lip adjacent the other end of the inner face of the base plate; said inner and outer lips defining the opening of the pocket so that said opening is in a plane perpendicular to the inner face of the base plate and the axis of the conduit.

3. A removable filter element for insertion into a conduit through a hole in the wall of the conduit, said filter element comprising: a base plate for sealing the hole in the conduit when the element has been inserted therethrough into the conduit, and a pocket element attached to the inner face of the base plate, the inner face of the base plate forming the outer side of the pocket, and said pocket element including a screen element extending from one end of the pocket adjacent one end of the inner face of the base plate inwardly at an oblique angle to the base plate to form the inner side of the pocket, an inner lip at the other end of the pocket, and an outer lip adjacent the other end of the inner face of the base plate; said inner and outer lips defining the opening of the pocket so that said opening is in a plane perpendicular to the inner face of the base plate and the axis of the conduit.

GEORGE W. MORK.
JOHN E. MARSON.
THOMAS G. PAULSEN.

References Cited in the file of this patent

UNITED STATES PATENTS

| Number | Name | Date |
|---|---|---|
| 326,569 | Kirkaldy | Sept. 22, 1885 |
| 551,044 | Park | Dec. 10, 1895 |
| 1,188,280 | Kuenzli | June 20, 1916 |
| 1,192,265 | Bird | July 25, 1916 |
| 1,364,435 | Harris | Jan. 4, 1921 |
| 1,605,022 | Hapgood | Nov. 2, 1926 |
| 1,889,325 | Whaley | Nov. 29, 1932 |
| 1,908,329 | Dunham | May 9, 1933 |
| 1,987,847 | Flood | Jan. 15, 1935 |
| 2,044,915 | Mosley | June 23, 1936 |
| 2,191,440 | Bush | Feb. 27, 1940 |
| 2,557,064 | Alexander | June 19, 1951 |

FOREIGN PATENTS

| Number | Country | Date |
|---|---|---|
| 167,506 | Switzerland | Feb. 28, 1934 |
| 872,028 | France | of 1942 |